Jan. 2, 1951 W. E. O'SHEI 2,536,211
APPARATUS FOR GENERATING ALTERNATING CURRENT
Filed Jan. 28, 1946

Inventor
Wm. E. O'Shei
By Emyl Coombe & Blair
Attorneys

Patented Jan. 2, 1951

2,536,211

UNITED STATES PATENT OFFICE 2,536,211

APPARATUS FOR GENERATING ALTERNATING CURRENT

William Edward O'Shei, London, England

Application January 28, 1946, Serial No. 643,919
In Great Britain January 27, 1945

3 Claims. (Cl. 171—97)

(Granted under the provisions of sec. 14, act of
March 2, 1927; 357 O. G. 5)

The present invention relates to apparatus for generating an alternating current, and is particularly suitable for generating an alternating current on a vehicle.

According to the present invention, an apparatus for generating alternating current comprises a prime mover, a D. C. electric generator, an over-running clutch coupling between said prime mover and generator for driving the generator by the prime mover and allowing the generator to be rotated in the same direction when the prime mover is stopped, a low voltage storage battery, electric circuit connections including an automatic cut-out for charging said battery from said generator when the latter is driven above a predetermined speed by the prime mover, means for producing an alternating current when said generator is being rotated, a first switch for controlling the supply of the alternating current produced to a load device, and further switch means which are simultaneously closed with the closure of said first switch, said further switch means short-circuiting the cut-out and enabling the battery to feed and drive the generator as a motor when the speed at which the generator is driven by the prime mover falls below that necessary for charging the battery.

It is known that the generator used for charging the battery is a source of alternating current so that the alternating current may be derived from this generator. Alternatively the alternating current may be produced by interrupting direct current from the low voltage battery by means of an interrupter driven by the generator, the interrupted D. C. being fed to a transformer.

In order that the invention may be more clearly understood and readily put into practice, some embodiments thereof will hereinafter be described by way of example, with reference to the accompanying drawing in which—

Figure 1:
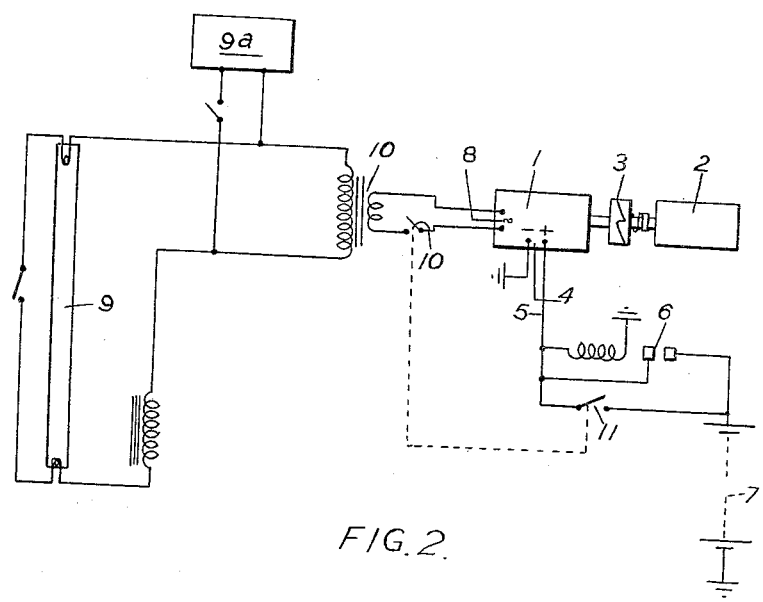
Figure 2:
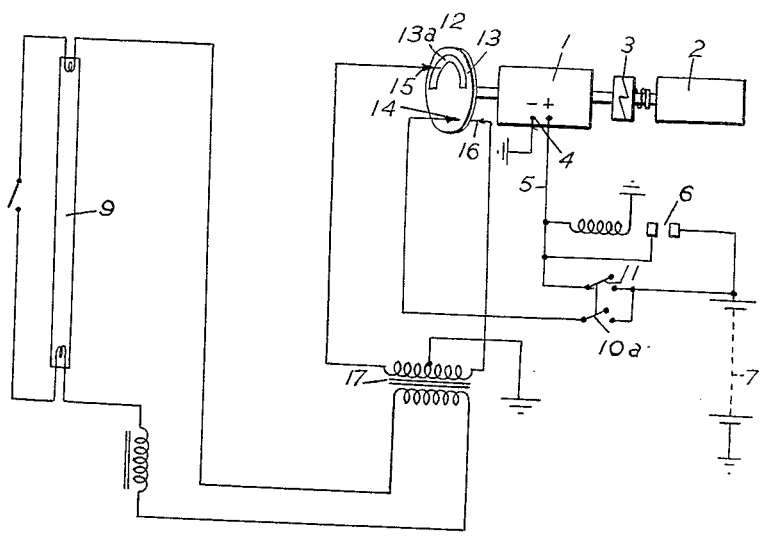

Fig. 1 shows a diagrammatic circuit arrangement for tapping off the alternating current supply from a vehicle generator and Fig. 2 shows a modification comprising a mechanical interrupter, for converting the direct current to alternating current.

Referring to Fig. 1 the generator 1 is coupled to the vehicle engine 2 through a one way clutch 3, and is provided with a pair of slip rings connected across the existing windings. When driven by the engine the generator charges the battery 7 in the normal way, the current passing from the output terminals 4, through the conductor 5 and cutout 6, to the battery 7 the return being through earth as shown. At the same time an alternating current output is supplied to the terminals 8 from the slip rings on the armature shaft of the generator.

This output is fed through a transformer 10 to the electrical components or accessories which need an alternating current supply, for example, in the present instance the output is fed to a fluorescent tube 9 and a radio set 9a.

A switch 10a is provided for switching off the alternating current supply when it is not required, and a switch 11 is provided for short circuiting the charging switch 6 so that the generator can be driven as a motor from the battery when the E. M. F. of the battery is greater than that of the generator, i. e. when the generator speed falls below that required for charging the battery. The switches 10a and 11 are coupled mechanically so that the generator will only be driven as a motor when the switch 10a is closed to operate a load device with A. C. current.

When the engine 2 is working the generator 1 coupled thereto through the one way clutch 3, supplies alternating current to the transformer 10 from the slip rings provided thereon, and at the same time charges the battery 7. When the speed of the engine falls below a predetermined value and thereby decreases the speed of the gnerator, the output therefrom will fall until such time that the EMF from the battery will be greater than that of the generator so that the battery will then drive the generator as a motor through the switch 11 thus providing a continuous supply of alternating current from the slip rings to the transformer, the generator then being disconnected from the engine at the clutch 3.

In the modification shown in Fig. 2 the engine 2 is coupled to the generator 1 through a one way clutch 3 and the direct current output from the terminals 4 is used to charge the battery 7 similarly to the arrangement shown in Fig. 1. In the present instance, however, an interrupter 12 is provided comprising a member 13 having an insulated portion 13a, secured to the armature shaft of the generator, and a series of contacts 14, 15 and 16. The positive output from the generator is connected to the member 13 through the contact 14 and to the positive pole of the battery 7, the negative pole of the battery, the negative output of the generator and the centre tapping of the primary winding of the transformer 17 being connected through earth. The transformer 17 is provided for stepping up the voltage to the equipment to be operated by alternating current. The ends of the primary winding of the transformer are connected to the contacts 15, 16 respectively. The member 13 is so constructed that as it is rotated the contacts 15, 16 make and break alternately thereby reversing the direction of the flow of current in the primary winding of the transformer, and providing a series of interrupted direct current impulses which may be fed to a fluorescent lamp 9 or other electrical equipment requiring an alternating current supply.

The operation of the apparatus shown in Fig. 2 is similar to that shown in Fig. 1, except that instead of taking the alternating current direct from the generator through slip rings, the direct current output is converted by the interrupter 12 before being fed to the transformer.

A switch 10a for cutting off the alternating current supply is provided and is mechanically connected to a switch 11 for connecting the generator to the battery so that the former can be driven as a motor as described with reference to Fig. 1.

The alternating current output from the transformer may be used for driving any electrical components or accessories on the vehicle which need an alternating current supply, such as a radio apparatus or gas discharge tubes, particularly fluorescent tubes, used for illumination. Such a fluorescent tube may be used in the headlamp of the vehicle and a feature of the invention consists in a vehicle having a headlamp comprising a fluorescent tube which is supplied with alternating current generated by the above described apparatus. The side and tail lamps of the vehicle preferably comprise filamentary bulbs fed directly from the low voltage battery. Since the headlamp is seldom required when the vehicle engine is not running, the vehicle may thus be left parked with the side and tail lamps being fed directly from the battery and without the generator being driven as a motor, thus avoiding the drain on the battery which would take place if the generator had to be driven as a motor at all times when the engine was stopped and the vehicle parked with lights on.

It will be understood that the arrangements described and shown in the drawing are given by way of example and that various modifications may be made without departing from the spirit of the invention.

I claim:

1. Apparatus for generating alternating current comprising a prime mover, a D. C. electric generator, an over-running clutch coupling between said prime mover and generator for driving the generator by the prime mover and allowing the generator to be rotated in the same direction when the prime mover is stopped, a low voltage storage battery, electric circuit connections including an automatic cut-out for charging said battery from said generator when the latter is driven above a predetermined speed by the prime mover, means for producing an alternating current when said generator is being rotated, a first switch for controlling the supply of the alternating current produced to a load device, and further switch means which are simultaneously closed with and consequent upon the closure of said first switch, said further switch means short-circuiting the cut-out and enabling the battery to feed and drive the generator as a motor when the speed at which the generator is driven by the prime mover falls below that necessary for charging the battery.

2. Apparatus for generating alternating current as claimed in claim 1, wherein the alternating current is derived from an armature winding of the generator.

3. Apparatus for generating an alternating current as claimed in claim 1, wherein the alternating current is produced by interrupting direct current from the low voltage battery by means of an interrupter driven by the generator, the interrupted D. C. being fed to a transformer.

WILLIAM EDWARD O'SHEI.

REFERENCES CITED

The following references are of record in the file of this patent:

UNITED STATES PATENTS

| Number | Name | Date |
|---|---|---|
| 1,279,392 | Martinetto | Sept. 17, 1918 |
| 1,439,483 | Ritter | Dec. 19, 1922 |
| 1,921,719 | Allen | Aug. 8, 1933 |
| 1,957,016 | Loudon | May 1, 1934 |
| 1,981,738 | McNeil | Nov. 20, 1934 |
| 2,117,019 | Conrad | May 10, 1938 |
| 2,319,835 | Williams | May 25, 1943 |